United States Patent

[11] 3,610,582

| [72] | Inventor | Gianfranco Passoni<br>Bumpliz, Berne, Switzerland |
|---|---|---|
| [21] | Appl. No. | 769,635 |
| [22] | Filed | Oct. 22, 1968 |
| [45] | Patented | Oct. 5, 1971 |
| [73] | Assignee | Icomag Trust Reg.<br>Vaduz, Liechtenstein |
| [32] | Priority | Oct. 25, 1967 |
| [33] | | Switzerland |
| [31] | | 15 049/67 |

[54] MOTOR-DRIVEN APPARATUS FOR DRAWING CONDUCTOR WIRES INTO CONDUITS
4 Claims, 4 Drawing Figs.

[52] U.S. Cl. .................................................. 254/134.3FT
[51] Int. Cl. .................................................. E21c 29/16
[50] Field of Search .......................................... 254/134.3;
15/104.3

[56] References Cited
UNITED STATES PATENTS

| 3,145,972 | 8/1964 | Sweeney | 254/134.3 |
| 3,206,782 | 9/1965 | Larsen | 254/134.3 X |
| 3,555,148 | 11/1967 | Botello | 254/134.3 |

Primary Examiner—Riordon Robert C.
Assistant Examiner—David R. Melton
Attorney—Linton & Linton ABSTRACT: A motor-driven apparatus for drawing conducting wires into conduits has a housing which has a detachable insertion tube for introduction into the conduit and for guiding the draw wire. The apparatus comprises means for wireless remote control of a reversing drive motor, an externally projecting switch for switching the motor on and off manually, a cable connector for the motor current and a cable connector for remote control of the motor by means of an electric lead. The apparatus has two pairs, fixed one behind the other, of driving discs which act elastically against each other in part, as a forward feed mechanism, and which are arranged that the move the draw wire forwards and backwards.

INVENTOR
GIANFRANCO PASSONI
By Linton and Linton
ATTORNEYS

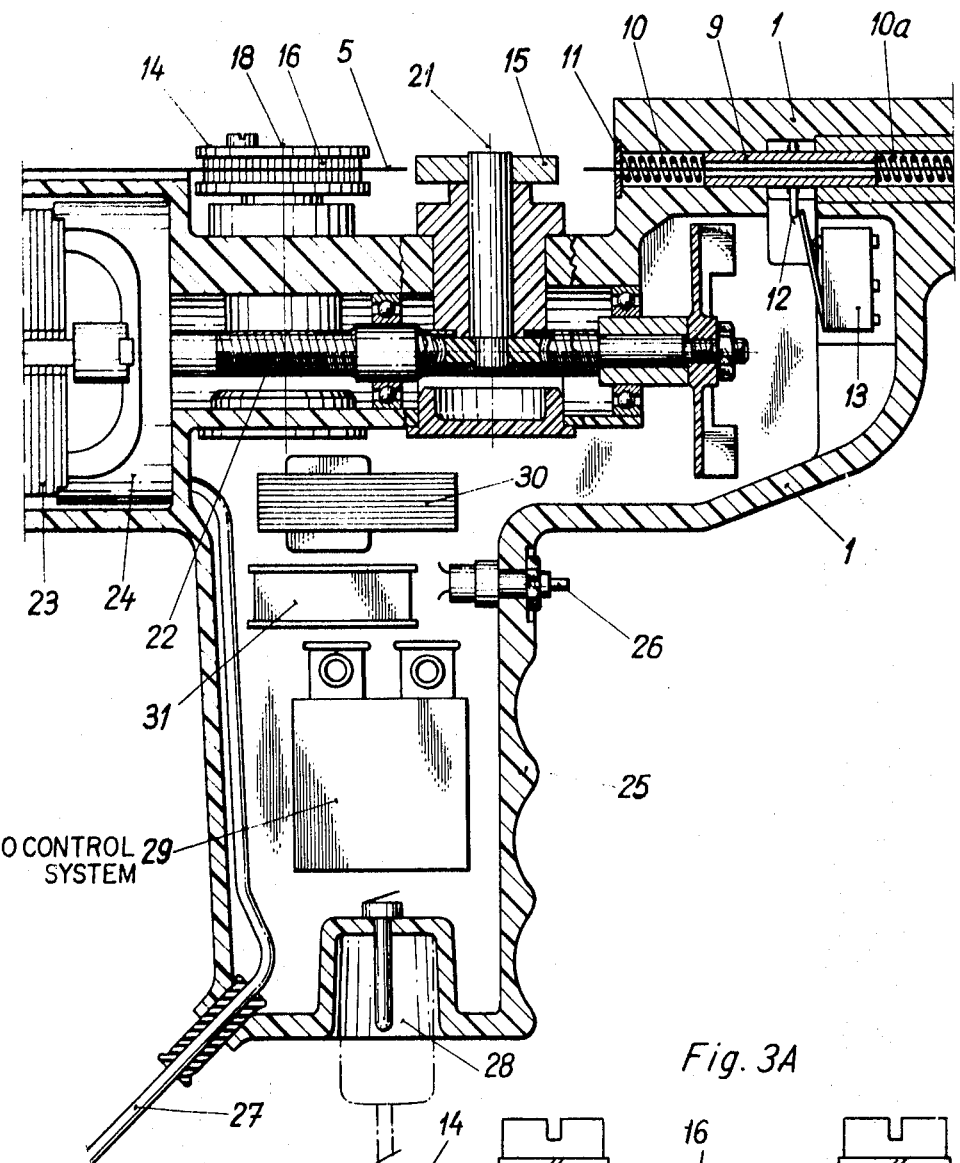
Fig.3
RADIO CONTROL SYSTEM 29
Fig.3A
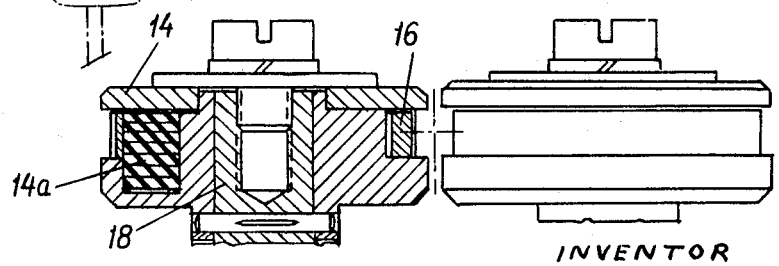
INVENTOR
GIANFRANCO PASSONI
By Linton and Linton
ATTORNEYS

MOTOR-DRIVEN APPARATUS FOR DRAWING CONDUCTOR WIRES INTO CONDUITS

The present invention relates to motor-driven apparatus for drawing conducting wires into conduits, and more particularly to such apparatus having a housing which has a demountable insertion tube, which is provided for introduction into the conduit and serves to guide the draw wire.

For conduits with slight curvature and relatively large inside diameter and especially in individual cases, a flexible spring steel wire is introduced into the beginning of the conduit and is passed by hand through the latter. The conducting wires are hereupon attached to the steel wire at the end of the conduit and the steel wire is again pulled out to the beginning of the conduit. The drawing of the attached conducting wires into the conduit is thereby carried out at the same time.

If however, the conduit has several curves and relatively great length, then the thrusting of the spring steel wire thereinto is troublesome, time consuming and often even dangerous, due to the sudden springing back and breaking of the spring steel wire which has been deformed into a helix.

Apparatus has been proposed, which brings a thin wire or a cord as the draw means, into the conduit or tubing by means of air pressure, whereby a plug is provided on the draw means at the front end, upon which a force is then exerted, away from the insertion end of the conduit, by means of compressed air, so that the plug moves through the tube like a piston.

Such apparatus is however, expensive and inconvenient, because of the compressed air system required in order to produce a sufficiently strong air current. In addition, the draw means must be very flexible and, on that account, very thin, so that it often can not sustain the tension necessary for drawing the conducting wires through, or else the air pressure is insufficient.

It is an object of the present invention to provide an apparatus which overcomes the aforesaid drawbacks and avoids the time consuming and tiring manual insertion and withdrawal of the steel wire in conduit or tubing. Such a motor-driven apparatus is convenient quick and largely automatic in operation, with accompanying advantages such as interruption of the feed motion and thrust and withdrawal movement proceeding by jerks during the pushing forwards of the forward end of the wire, as well as pulsating forward feed movement, with the potentiality for springback resilience of the steel wire.

According to the invention there is provided a motor-driven apparatus for drawing conducting wires into conduits, which comprises means for the wireless remote control of the reversing drive motor, a switch button, projecting externally, for switching the motor manually on and off, a cable connector for the motor current and a cable connector for the remote control of the motor by means of electrical leads, and possessing, as the forward feed mechanism, two pairs of driving discs, fixed one behind the other, acting against each other elastically in part, and arranged so that they move the draw wire forwards or backwards in a straight line, in which the four driving discs are mounted on vertical spindles, of which at least one of these spindles on the inner side of each pair of discs can be driven by a horizontal worm shaft, which wormshaft is connected coaxially to the motor.

In order that the invention may be more clearly understood one embodiment of an apparatus according to the invention is described below purely by way of illustrative but nonlimiting example and with reference to the accompanying drawings in which:

FIG. 3 shows a longitudinal section of the central part of the elevation in FIG. 1.

FIG. 3A is a detail of the drive disc and rubber bushing.

Figure 1:
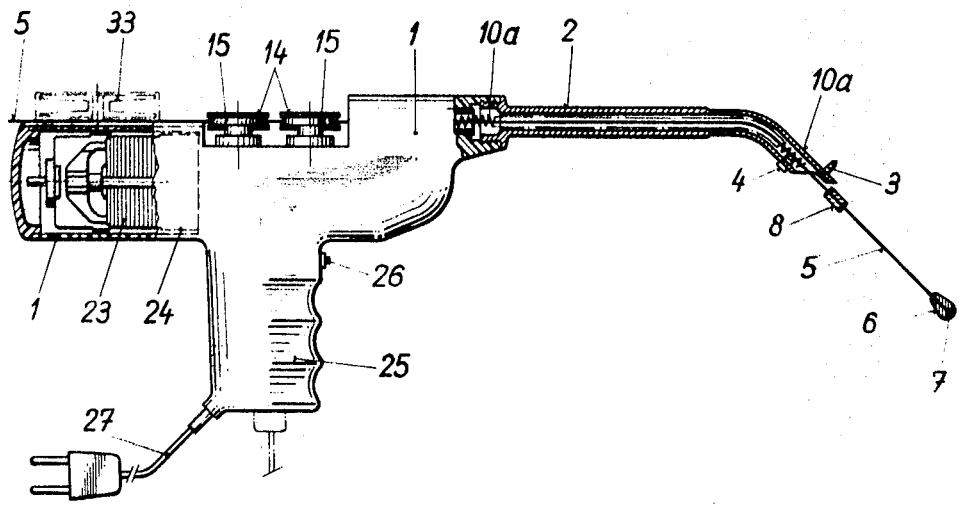
FIG. 1 shows an embodiment of an apparatus according to the invention in partial longitudinal section in outline.

Referring now to the drawings, the housing 1 is of pistol form. An insertion tube 2, which can be screwed in, is fitted at the front end and serves for insertion into the conduit or tubing, into which the conducting cables are to be drawn. In order that the insertion tube 2 can accept axial tension and thrust forces in operation, it is provided at its front end, with spikes 3, 4 for gripping, which engage in the conduit or tubing.

A spring steel wire 5 is led through the insertion tube 2, and serves as the draw wire. A slider 6 is secured against slipping to this latter at its front end. The slider 6 is of teardrop shape and has a depression at its front end in which is located a drawing loop 7. Tripping cams 8 are clamped securely before the ends of the wire 5.

The wire 5 leads in a straight line from the insertion tube through a guide bush 9 towards the rear. This latter is situated between two compression springs 10, 10a, in which the spring 10 is supported axially on the disc 11. When the wire 5 reaches its end position the tripping cam 8 presses against the guide bush 9. This latter serves as connecting bush and is provided with a projection 12 which operates a limit switch 13.

Figure 2:
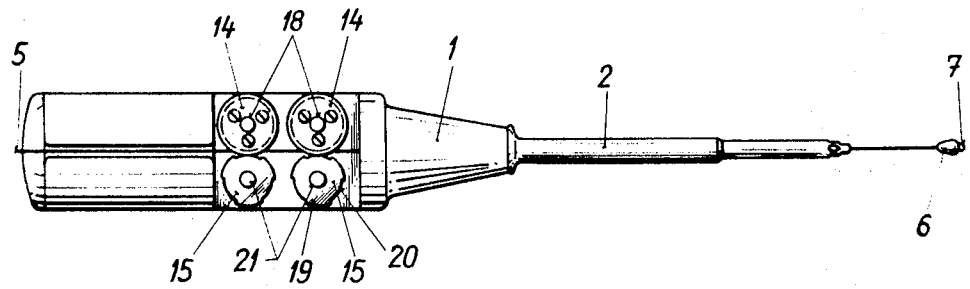
FIG. 2 shows a plan view of the embodiment of FIG. 1.

The wire 5 is led in a straight line to the rear between the driving discs 14, 15 of two pairs of discs. The discs 14 have driving teeth 16 and are connected elastically through a plurality of rubber bushings 14a with their disc spindle 18. The discs 15 have pressure surfaces 19 and recessed portions 20 on their circumference (FIG. 2). Due to the rubber bushings, the discs 14 with their teeth 16 press the metal wire 5 elastically against the pressure surfaces 19 of the opposed discs 15, so that the rotating discs 14, 15 move the wire 5 forward due to friction. The recessed portions 20 of the discs 15 allow the wire 5 to become loosened at the locations 20 and to relax thereby in its longitudinal direction.

The four driving discs 14, 15 are mounted on vertical spindles 18, 21, when at least the spindles 21 on the inner side of each pair 18, 21 are driven through a horizontal worm shaft 22. This is connected coaxially with a commutator-type motor 23 with commuting poles, the motor 23 being housed at the rear part of the housing 1 in a cylindrical cavity 24. Beneath the driving discs 14, 15 the housing 1 has a pistol grip 25. A switch button 26 projects at the position of the index finger. This former serves for the direct switching on and off of the motor 23 and for the changing over of its poles, so that the motor 23 and, with it, the discs 14, 15 can run forward and in reverse.

Beneath the pistol grip 25, cable connectors 27, 28 are provided for the motor current, receiver current and relay current as well as for remote control of the motor 23 by means of an electrical lead. A command receiving system 29 for motor control by radio and a relay 30 as well as contactor switch gear 31 for the receiving system 29 are housed in the cavity of the piston grip 25.

A wire spool 33 is provided at the rear of the housing 1 for the automatic winding-on and -off of the draw wire 5. For very long conductor conduits, a separate spool can be provided for the draw wire 5, for example, combined with a driven device for drawing the wire through, constructed as a free-standing unit, with a flexible guide tube to the conduit.

In use the slider 6 and the insertion tube 2 of the apparatus are pushed into the conduit. Consequent upon the weight of the apparatus and the lever effect, the insertion tube 2 is held secure by means of gripping spikes 3, 4. Switching-on of the motor 23 in a suitable direction of running, is effected by means of the switch 26 or by remote control, when the steel wire 5 with its slider 6 is drawn through the conduit. Should the slider 6 strike a projecting edge in a curve of the tubing or stick in the tubing because of foreign bodies present in it, then the steel wire 5 is able to spring back, on account of the recesses 20 on the disc 15, so that a pulsating force action on the wire 5 results therefrom. Consequently, on the one hand the wire is not simply thrust on again, and on the other hand the slider 6 with its smooth surface can avoid the obstruction.

During the insertion of the wire, the operator can go to the other end of the conduit and, on the emergence of the slider 6, can shut off the motor 23 by remote control by means of a wire, sound waves or radio waves.

After attaching the conductor wires to the eye 7 on the slider 6, the pole-reversing switch and the motor switch are operated by remote control, so control, the apparatus draws the slider 6 towards itself together with the conductor wires hanging from it. The tripping cam 8 near the slider 6 then effects the final switching off of the motor 23.

Thanks to the remote control and the automatic final switching-off, only one operator is required and the insertion of the conductor wires can be carried out quickly and without difficulty.

It will be apparent that various changes and modifications may be made in the embodiment described without departing from the essential concept of the invention as defined in scope by the appended claims.

I claim:

1. A motor-driven apparatus for drawing conductor wires into conduits comprising a housing, an insertion tube detachably connected to said housing and capable of introduction into the conduit and for guiding the draw wire, a reversible drive motor in said housing, means for the wireless remote control of said drive motor, an externally projecting switch button on said housing for switching said drive motor on and off manually, a cable connector for said drive motor, a cable connector for the remote control of said drive motor, two pairs of driving discs, positioned one behind the other, which act elastically against each other in part as a forward feed mechanism and which are so arranged that they move the draw wire forwards and backwards in a straight line, spindles rotatably mounted on said housing and having said driving discs mounted thereon and a worm shaft fixedly connected coaxially with said drive motor and is in driving connection with at least one of said spindles.

2. An apparatus as claimed in claim 1, wherein said wireless remote control means comprise a command receiver, a relay and contactor switchgear.

3. An apparatus as claimed in claim 2, wherein the receiver system is constructed for command signals which are transmitted by means of sound waves.

4. An apparatus as claimed in claim 2, wherein the receiver system is constructed for command signals which are transmitted by means of radio waves.